United States Patent
Sato (10) Patent No.: US 7,315,423 B2
(45) Date of Patent: Jan. 1, 2008

(54) ZOOM LENS INCLUDING FOUR LENS GROUPS

(75) Inventor: Kenichi Sato, Ageo (JP)

(73) Assignee: Fujinon Corporation, Saitama (JP)

( * ) Notice: Subject to any disclaimer, the term of this patent is extended or adjusted under 35 U.S.C. 154(b) by 182 days.

(21) Appl. No.: 11/345,318

(22) Filed: Feb. 2, 2006

(65) Prior Publication Data

US 2006/0215277 A1    Sep. 28, 2006

(30) Foreign Application Priority Data

Mar. 25, 2005    (JP)    ............................. 2005-088556

(51) Int. Cl.
G02B 15/14    (2006.01)
G02B 17/00    (2006.01)

(52) U.S. Cl. ..................... 359/687; 359/684; 359/733

(58) Field of Classification Search ................ 359/687, 359/683–685
See application file for complete search history.

(56) References Cited

U.S. PATENT DOCUMENTS 5,379,157 A    1/1995 Wang
7,145,730 B2*    12/2006 Mihara ....................... 359/686
7,154,680 B2*    12/2006 Satori et al. ................. 359/687
7,180,542 B2*    2/2007 Iwasawa et al. ......... 348/240.3
2006/0274426 A1    12/2006 Sueyoshi

FOREIGN PATENT DOCUMENTS

| JP | 2000-131610 | 5/2000 |
| JP | 2001-235681 | 8/2001 |
| JP | 2003-344772 | 12/2003 |
| JP | 2004-226997 | 8/2004 |

* cited by examiner

Primary Examiner—Jordan M. Schwartz
(74) Attorney, Agent, or Firm—Arnold International; Jon W. Henry; Bruce Y. Arnold (57) ABSTRACT

A zoom lens that is designed to enable a thinner image pickup device includes, in order from the object side, a first lens group having positive refractive power and a reflecting surface for folding the optical axis of the zoom lens approximately ninety degrees, a second lens group having negative refractive power, a third lens group having positive refractive power with a stop at its image side, and a fourth lens group having positive refractive power. The second lens group and the fourth lens group move along the optical axis during zooming, and the fourth lens group moves along the optical axis during focusing. The four lens groups have particular constructions and the zoom lens satisfies specified conditions related to the focal lengths of specified lens groups, the focal length of the zoom lens at the telephoto end, and the Abbe number of a specified lens element.

4 Claims, 4 Drawing Sheets

Spherical Aberration
Fig. 3A

Astigmatism
Fig. 3B

Distortion
Fig. 3C

Lateral Color
Fig. 3D

Spherical Aberration
Fig. 4A

Astigmatism
Fig. 4B

Distortion
Fig. 4C

Lateral Color
Fig. 4D

Spherical Aberration
Fig. 5A

Astigmatism
Fig. 5B

Distortion
Fig. 5C

Lateral Color
Fig. 5D

Spherical Aberration
Fig. 6A

Astigmatism
Fig. 6B

Distortion
Fig. 6C

Lateral Color
Fig. 6D

ZOOM LENS INCLUDING FOUR LENS GROUPS

TECHNICAL FIELD OF THE INVENTION

The present invention relates to a zoom lens suitable for use in small equipment having an image pickup capability, such as PDAs (personal digital assistants), video cameras, and digital still cameras (commonly referred to as digital cameras), and similar devices.

BACKGROUND OF THE INVENTION

Image pickup elements, such as CCDs (Charge Coupled Devices) and CMOSs (Complementary Metal Oxide Semiconductors), have been used in digital still cameras and similar imaging devices with image pickup elements that are extremely miniaturized. This miniaturization, along with the light weight that this miniaturization supports, has been accompanied by a demand that the main body of the image pickup devices and the lenses mounted in these devices and used for imaging be similarly miniaturized and made light weight.

In recent years, image pickup elements having a large number of pixels have been developed in order to achieve high image quality, and lens systems that provide even higher resolution and higher contrast performance also have been required. Moreover, there is now a requirement for an optical zoom mode capable of zooming without deterioration of the image and the development of a compact image pickup device mounted with a zoom lens has been desired.

In an image pickup device using a mounted zoom lens for imaging, the thickness of the image pickup device is largely dependent upon the size of the lens system. Particularly, in a construction in which optical elements forming the lens system are arrayed linearly in one direction without changing the direction of the optical axis, the size of the image pickup device in the thickness direction is actually determined by the length from the optical element on the object side of the lens system to an image pickup element. On the other hand, the larger the number of lens elements in the lens system, the more easily the recent requirements for a larger number of pixels and higher performance of the image pickup element may be satisfied, making it difficult to shorten the overall length of the lens system, and, in turn, making it difficult to make the entire image pickup device thinner. Accordingly, a zoom lens has been proposed that adopts a so-called reflective optical system in which the optical path of the lens system is folded in order to make the image pickup device thinner.

For example, the zoom lens described in Japanese Laid-Open Patent Application 2000-131610 is constructed with a first lens group having positive refractive power, a second lens group having negative refractive power, a third lens group having positive refractive power and a fourth lens group having positive refractive power, and, additionally, includes a prism having a reflective surface for folding the optical path at least approximately ninety degrees in the first lens group. This zoom lens performs zooming by moving the second lens group and the fourth lens group.

When the zoom lens described in Japanese Laid-Open Patent Application 2000-131610 is mounted in an image pickup device, its thickness as an image pickup device greatly depends on the size of the portion of the first lens group, that is used for folding the optical path, rather than the overall length of the zoom lens along the optical axis. Therefore, in order to make the image pickup device thinner, it is preferable to miniaturize the first lens group. In the zoom lens of Japanese Laid-Open Patent Application 2000-131610, the lens element on the object side of the zoom lens is especially large and there is room for improvement in terms of miniaturization. Additionally, the development of a zoom lens that relaxes requirements for minimizing the diameter of the lens element on the object side in achieving miniaturization and that is suitable for mounting in an image pickup device in order to make it thinner, has been desired.

BRIEF SUMMARY OF THE INVENTION

The present invention relates to a zoom lens suitable for mounting in an image pickup device in order to make the image pickup device thinner.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
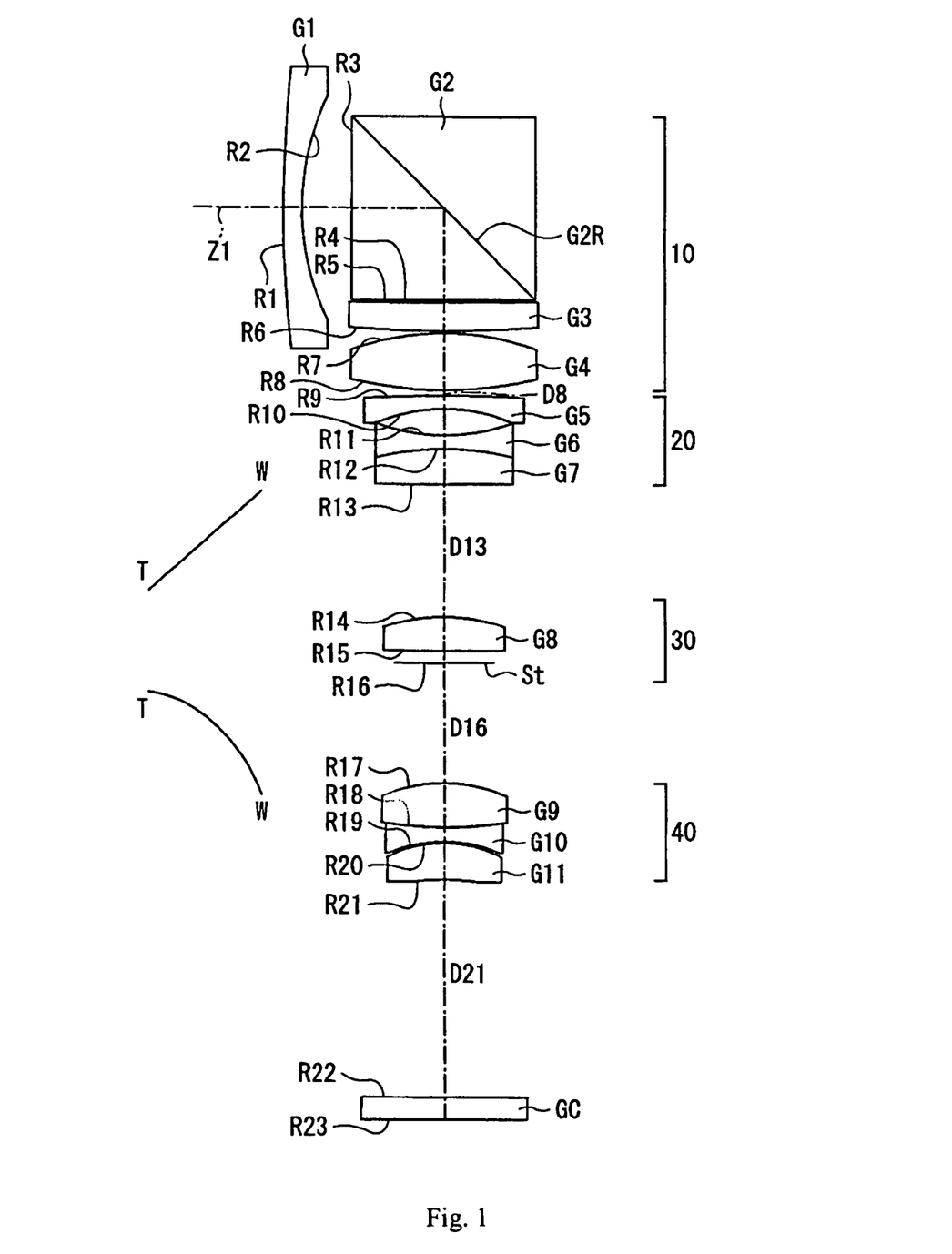
FIG. 1 shows a cross-sectional view of the zoom lens of Embodiment 1 at the wide-angle end.

A general description of the zoom lens of the present invention that pertains to two embodiments of the invention, described in more detail below, will first be given with reference to FIG. 1 that shows Embodiment 1. In FIG. 1, lens elements are referenced by the letter G followed by a number denoting their order from the object side of the zoom lens along the optical axis Z1, from G1 to G11. Similarly, radii of curvature of the surfaces of the various optical elements, including the lens surfaces, are referenced by the letter R followed by a number denoting their order from the object side of the zoom lens, from R1 to R23. The on-axis surface spacings along the optical axis Z1 of the various optical surfaces are referenced by the letter D followed by a number denoting their order from the object side of the zoom lens, but only the spacings that vary with zooming are labeled on the figures. In a similar manner, the four lens groups are labeled 10, 20, 30, and 40 in order from the object side of the zoom lens and the lens components belonging to each lens group are indicated by the brackets adjacent the labels 10, 20, 30 and 40.

The term "lens group" is defined in terms of "lens elements" and "lens components" as explained herein. The term "lens element" is herein defined as a single transparent mass of refractive material having two opposed refracting surfaces, which surfaces are positioned at least generally transversely of the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." The term "lens group" is herein defined as an assembly of one or more lens components in optical series and with no intervening lens components along an optical axis that during zooming is movable as a single unit relative to another lens component or other lens components.

As shown in FIG. 1, a straight line to the left of lens group 20 and a curved line to the left of lens group 40 have their ends labeled with a W to indicate these lens groups positions along the optical axis at the wide-angle end and with a T to indicate these lens groups positions along the optical axis at the telephoto end. In accordance with the vertical component of these line segments as shown in FIG. 1, lens group 20 and lens group 40 move along the optical axis Z1 during zooming in order to vary the surface spacings D8, D13, D16, and D21. Embodiment 2, shown in FIG. 2, operates in the same manner.

The zoom lens of the present invention is suitable for being mounted and used in small equipment having an image pickup capability, such as PDAs (Personal Digital Assistants), video cameras, digital still cameras, and similar imaging devices and includes, in order from the object side along the optical axis Z1, a first lens group 10 of positive refractive power and having a reflecting member with a reflecting surface for folding the optical axis at least approximately ninety degrees, a second lens group 20 having negative refractive power, a third lens group 30 having positive refractive power and having a stop St on its image side, and a fourth lens group 40 having positive refractive power. As shown in FIG. 1, a right-angle prism G2 in the first lens group 10 serves as the reflecting member having a reflecting surface for folding the optical axis at least approximately ninety degrees. By providing the reflecting surface within the first lens group 10 having refractive elements and properly constructing the various lens groups, a thin construction can be made.

An image pickup element (not shown in the drawings) is arranged at the image plane of the zoom lens. Various optical elements are represented by a structure labeled GC in FIG. 1 that is arranged between the fourth lens group 40 and the image pickup plane in accordance with the construction with this location being at the image end of the zoom lens where the main body of the image pickup device, such as a camera, is located. Exemplary optical elements for the structure labeled GC in FIG. 1 include a glass cover for protection of the image pickup element and various optical filters.

In the zoom lens of the present invention, the second lens group 20 and the fourth lens group 40 move along the optical axis during zooming and the fourth lens group 40 moves along the optical axis during focusing. The second lens group 20 mainly provides a variator function of changing the focal length and the fourth lens group 40 mainly provides a compensating function of correcting for image plane fluctuation associated with the changing of the focal length. The second lens group 20 and the fourth lens group 40 move along the optical axis as indicated by the locus of points shown by solid lines in FIG. 1. The first lens group 10 and the third lens group 30 are stationary during zooming and focusing.

The zoom lens of the present invention satisfies the following Conditions (1) and (2):

$-0.45 < f2/Tf < -0.3$  Condition (1)

$0.8 < f4/Tf < 1.3$  Condition (2)

where f2 is the focal length of the second lens group 20, f4 is the focal length of the fourth lens group 40, and Tf is the focal length of the entire zoom lens at the telephoto end.

By properly satisfying Conditions (1) and (2) above that apply to the two lens groups, 20 and 40, that move along the optical axis during zooming and to lens group 40 that moves along the optical axis during focusing, the zoom lens can be miniaturized while improving the correction of aberrations with proper choices of optical characteristics of the various lens groups.

Condition (1) above prescribes a proper relationship between the focal length f2 of the second lens group 20 and the focal length Tf of the entire zoom lens at the telephoto end. If the upper limit of Condition (1) above is not satisfied, the refractive power of the second lens group 20 intensifies too much and the fluctuation of the image focus position increases so much that errors in focus position occur as the focus position changes. If the lower limit of Condition (1) above is not satisfied, the required movement of the second lens group 20 along the optical axis during zooming becomes too large, making the length of the entire zoom lens too large.

Condition (2) above prescribes a proper relationship between the focal length f4 of the fourth lens group 40 and the focal length Tf of the zoom lens at the telephoto end. If the lower limit of Condition (2) above is not satisfied, the refractive power of the fourth lens group 40 increases so much that errors in focus position occur as the focus position changes. If the upper limit of Condition (2) above is not satisfied, the required movement of the fourth lens group 40 along the optical axis during zooming becomes too large, making the length of the zoom lens too large.

The first lens group 10 has positive refractive power and includes a lens element G1 of negative refractive power and a meniscus shape with its convex surface on the object side, a right-angle prism G2 that provides a reflecting surface G2R for folding the optical axis at least approximately ninety degrees, a lens element G3 of positive refractive power and having a convex surface on the image side, and a biconvex lens element G4. Moreover, another optical member, such as a mirror, may also be used in place of the right-angle prism G2.

It is preferable that the miniaturization of the first lens group 10 be fully achieved in order to provide thinness when the zoom lens is mounted on an image pickup device. For example, it is preferable that the refractive index $N_d$ (at the d-line) of the lens elements G1 and G3 that are adjacent opposite sides of the right-angle prism G2 be large (for example, 1.8) in order to enable the diameters and the thicknesses of the lens elements G1 and G3 to be decreased. This provides an advantageous shape for these lens elements, namely, a shape not having too large a radius of curvature and that enables miniaturizing the size of the right-angle prism G2.

As shown in FIG. 1, the second lens group 20 has negative refractive power and includes, in order from the object side, a lens element G5 of negative refractive power and a meniscus shape with its convex surface on the object side, and a lens component of negative refractive power that is formed by cementing together at least two lens elements. As shown in FIG. 1, the cemented lens component includes a biconcave lens element G6 and a lens element G7 having positive refractive power with a convex surface on the object side. Preferably, the lens element having positive refractive power in the cemented lens component of the second lens group, i.e., lens element G7 in FIG. 1, satisfies the following Condition (3):

$$25 > vP \qquad \text{Condition (3)}$$

where vP is the Abbe number of the lens element having positive refractive power in the second lens group.

Condition (3) above is a condition for favorably correcting chromatic aberrations when it is satisfied and prescribes a proper lens material for the lens element G7 of positive refractive power in the cemented lens component of the second lens group 20. If Condition (3) above is not satisfied, it becomes difficult to favorably correct chromatic aberrations.

As shown in FIG. 1, the third lens group 30 includes a single lens element G8 and a stop St. It is preferable that the lens element G8 be made of a plastic material and have at least one aspheric surface. The length of the third lens group 30 can be shortened by arranging the stop St on the image side of lens element G8.

The fourth lens group 40 includes a lens component having negative refractive power that is formed by cementing together at least two lens elements, and a lens component having positive refractive power and a meniscus shape with at least one aspheric surface and with its convex surface on the object side. In particular, as shown in FIG. 1, the fourth lens group 40 includes a cemented lens component having negative refractive power and a lens component (i.e., lens element G11) having positive refractive power and a meniscus shape with its convex surface on the object side and having at least one aspheric surface, wherein the cemented lens component is formed of lens element G9 having positive refractive power with a convex surface on the object side and lens element G10 having negative refractive power with a concave surface on the image side.

The advantageous actions and effects of a zoom lens constructed as described above will now be given. An object beam entering into the first lens group 10 is folded approximately ninety degrees so as to be directed toward the second lens group 20 side by reflection from the reflecting surface G2R of the right-angle prism G2 in order to be imaged onto an image pickup element (not shown in the drawings) that is arranged to be perpendicular to the optical axis as reflected by the reflecting surface G2R of the first lens group 10. Zooming is carried out by moving the second lens group 20 and the fourth lens group 40 along the optical axis Z1 to change the separations of the various lens groups.

As described above, the zoom lens of the present invention enables realizing a zoom lens suitable for mounting on an image pickup device so as to make the device thinner by arranging a right-angle prism G2 for folding the optical axis at least approximately ninety degrees in the first lens group 10 and by properly designing the construction of the various lens groups.

Embodiments 1 and 2 of the zoom lens of the present invention will now be individually described with further reference to the drawings.

Embodiment 1

FIG. 1 shows a cross-sectional view of the zoom lens of Embodiment 1 at the wide-angle end. Table 1 below lists the group number (or GC, as appropriate), the surface number # in order from the object side, the radius of curvature R (in mm) of each surface on the optical axis, the on-axis surface spacing D (in mm) except that the on-axis surface spacings that vary with zooming are listed in Table 3 below, as well as the refractive index $N_d$ and the Abbe number $v_d$ at the d-line (587.6 nm) of each optical element of Embodiment 1. Note that although R is the on-axis radius of curvature, for convenience of illustration, in FIG. 1 the lead lines from the R reference symbols extend to the surfaces being referenced but do not extend to the on-axis positions. Listed in the bottom portion of Table 1 are the focal length f (in mm) and the f-number $F_{NO}$ at the wide-angle and telephoto ends, and the maximum field angle 2ω at the wide-angle end and at the telephoto end for Embodiment 1.

TABLE 1

|    | #   | R          | D            | $N_d$   | $v_d$ |
|----|-----|------------|--------------|---------|-------|
| 10 | 1   | 72.5600    | 1.07         | 1.92286 | 20.9  |
| 10 | 2   | 14.7478    | 2.90         |         |       |
| 10 | 3   | ∞          | 10.70        | 1.83481 | 42.7  |
| 10 | 4   | ∞          | 0.13         |         |       |
| 10 | 5   | ∞          | 1.67         | 1.71736 | 29.5  |
| 10 | 6   | −69.5334   | 0.13         |         |       |
| 10 | 7*  | 15.7363    | 3.30         | 1.56865 | 58.6  |
| 10 | 8*  | −21.2512   | D8 (variable)|         |       |
| 20 | 9   | 74.0231    | 0.80         | 1.72916 | 54.7  |
| 20 | 10  | 10.0301    | 1.52         |         |       |
| 20 | 11  | −11.5938   | 0.81         | 1.80400 | 46.6  |
| 20 | 12  | 14.9771    | 2.07         | 1.92286 | 18.9  |
| 20 | 13  | −400.7889  | D13 (variable)|        |       |
| 30 | 14* | 10.9188    | 2.00         | 1.50869 | 56.0  |
| 30 | 15* | −76.4357   | 0.70         |         |       |
| 30 | 16  | ∞ (stop)   | D16 (variable)|        |       |
| 40 | 17  | 8.7174     | 2.61         | 1.83481 | 42.7  |
| 40 | 18  | −21.5063   | 0.80         | 1.84666 | 23.8  |
| 40 | 19  | 7.8581     | 0.13         |         |       |
| 40 | 20* | 8.3223     | 2.10         | 1.59380 | 61.4  |
| 40 | 21* | 18.9265    | D21 (variable)|        |       |
| GC | 22  | ∞          | 1.30         | 1.51680 | 64.2  |
| GC | 23  | ∞          |              |         |       | f = 8.20-22.55   $F_{NO}$ = 3.60-4.29   2ω = 64.3°-23.3°

The lens surfaces with a * to the right of the surface number in Table 1 are aspheric lens surfaces. In the zoom lens of Embodiment 1 as shown in FIG. 1, both surfaces of lens element G4, which has positive refractive power and is in the first lens group 10, are aspheric, both surfaces of lens element G8, which has positive refractive power and is in the third lens group 30, are aspheric, and both surfaces of lens element G11, which has positive refractive power and is in the fourth lens group 40, are aspheric. The aspheric surface shapes of these lens surfaces are expressed by the following equation:

$$Z = [(C \cdot Y^2)/\{1 + (1 - K \cdot C^2 \cdot Y^2)^{1/2}\}] + A_4 \cdot Y^4 + A_6 \cdot Y^6 + A_8 \cdot Y^8 + A_{10} \cdot Y^{10} \qquad \text{Equation (A)}$$

where

Z is the length (in mm) of a line drawn from a point on the aspheric lens surface at a distance Y from the optical axis to the tangential plane of the aspheric surface vertex, C is the curvature (=1/the radius of curvature, R in mm) of the aspheric lens surface on the optical axis, Y is the distance (in mm) from the optical axis, K is the eccentricity, and $A_i$ is the ith aspheric coefficient, and the summation extends over i.

In Embodiment 1 of the present invention, only the aspheric coefficients $A_4$, $A_6$, $A_8$, and $A_{10}$ are non-zero.

Table 2 below lists the values of the constant K and the aspheric coefficients $A_4$, $A_6$, $A_8$, and $A_{10}$ used in Equation (A) above to define each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_4$ | $A_6$ | $A_8$ | $A_{10}$ |
|---|---|---|---|---|---|
| 7 | 0.8967 | −2.0692E−5 | −4.3028E−7 | 2.5322E−8 | −3.5126E−10 |
| 8 | 0.9620 | 3.7962E−5 | −9.7272E−8 | 1.9221E−8 | −3.5547E−10 |
| 14 | 1.0017 | 1.3122E−5 | −8.3763E−8 | 2.4912E−7 | −8.4461E−9 |
| 15 | 0.9987 | 1.6687E−4 | 4.6494E−6 | −2.3911E−7 | 7.1609E−9 |
| 20 | 1.2098 | 7.0039E−4 | 1.5456E−5 | 2.7782E−7 | 4.7346E−9 |
| 21 | 1.0617 | 1.5569E−3 | 3.3671E−5 | 1.4660E−6 | 1.3569E−8 |

In the zoom lens of Embodiment 1, lens groups 20 and 40 move along the optical axis during zooming to vary the separations of the four lens groups in order to provide a zoom ratio of about three. Therefore, the values of the on-axis spacings D8, D13, D16, and D21 vary. Table 3 below lists the values of these variables (i.e., the group spacings) at the wide-angle end (focal length f equals 8.20 mm) and at the telephoto end (focal length f equals 22.55 mm) with the zoom lens focused at infinity.

TABLE 3

| Focal Length f (mm) | D8 | D13 | D16 | D21 |
|---|---|---|---|---|
| 8.20 | 0.30 | 9.62 | 7.75 | 12.69 |
| 22.55 | 7.86 | 2.05 | 3.34 | 17.10 |

As set forth in Table 4 below, the zoom lens of Embodiment 1 of the present invention satisfies all of the Conditions (1) through (3) above.

TABLE 4

| Condition No. | Condition | Value |
|---|---|---|
| (1) | −0.45 < f2/Tf < −0.3 | −0.35 |
| (2) | 0.8 < f4/Tf < 1.3 | 1.06 |
| (3) | 25 > vP | 18.90 |

Figure 3A:
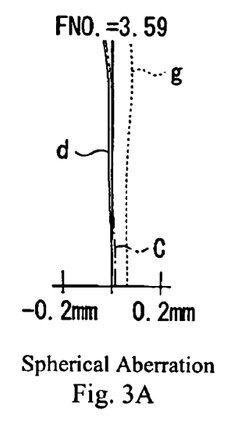
FIGS. 3A-3D show the spherical aberration, astigmatism, distortion, and lateral color, respectively, of the zoom lens of Embodiment 1 at the wide-angle end.
Figure 3B:
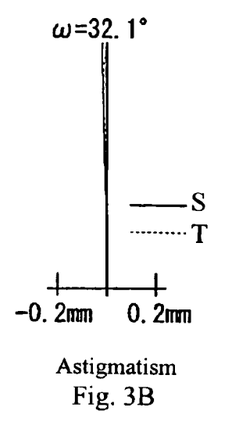
Figure 3C:
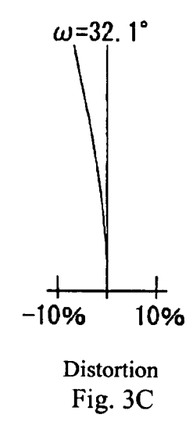
Figure 3D:
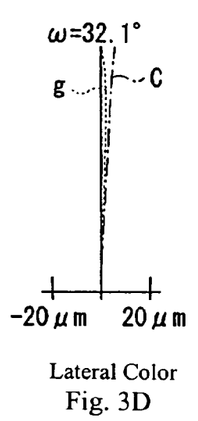
Figure 4A:
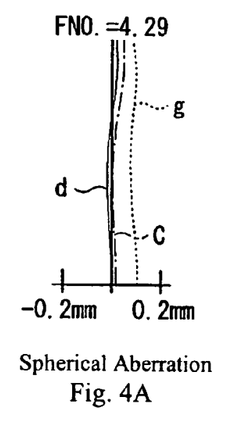
FIGS. 4A-4D show the spherical aberration, astigmatism, distortion, and lateral color, respectively, of the zoom lens of Embodiment 1 at the telephoto end.
Figure 4B:
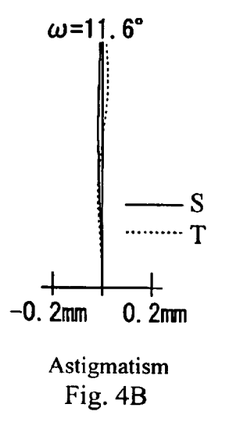
Figure 4C:
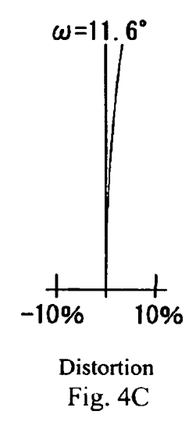
Figure 4D:
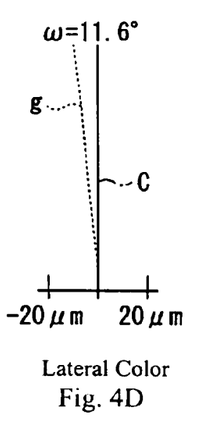

FIGS. 3A-3D show the spherical aberration, astigmatism, distortion, and lateral color, respectively, of the zoom lens of Embodiment 1 at the wide-angle end. FIGS. 4A-4D show the spherical aberration, astigmatism, distortion, and lateral color, respectively, of the zoom lens of Embodiment 1 at the telephoto end. In FIGS. 3A and 4A, the spherical aberration (in mm) is shown for the wavelengths 587.6 nm (the d-line), 435.8 nm (the g-line), and 656.3 nm (the C-line), and the f-number (FNO.) is shown. In the remaining figures, ω is the half-field angle. In FIGS. 3B and 4B, the astigmatism (in mm) is shown for both the sagittal image surface S (solid line) and the tangential image surface T (broken line) and is measured at 587.6 nm (the d-line). In FIGS. 3C and 4C, distortion (in percent) is measured at 587.6 nm (the d-line). In FIGS. 3D and 4D, the lateral color (in μm) is shown for the wavelengths 435.8 nm (the g-line) and 656.3 nm (the C-line) relative to 587.6 nm (the d-line).

As is evident from FIGS. 3A-3D and 4A-4D and from the numerical data in the tables above, aberrations are well corrected in Embodiment 1 of the present invention, and a zoom lens suitable for mounting in a thin image pickup device can be realized.

Embodiment 2

Figure 2:
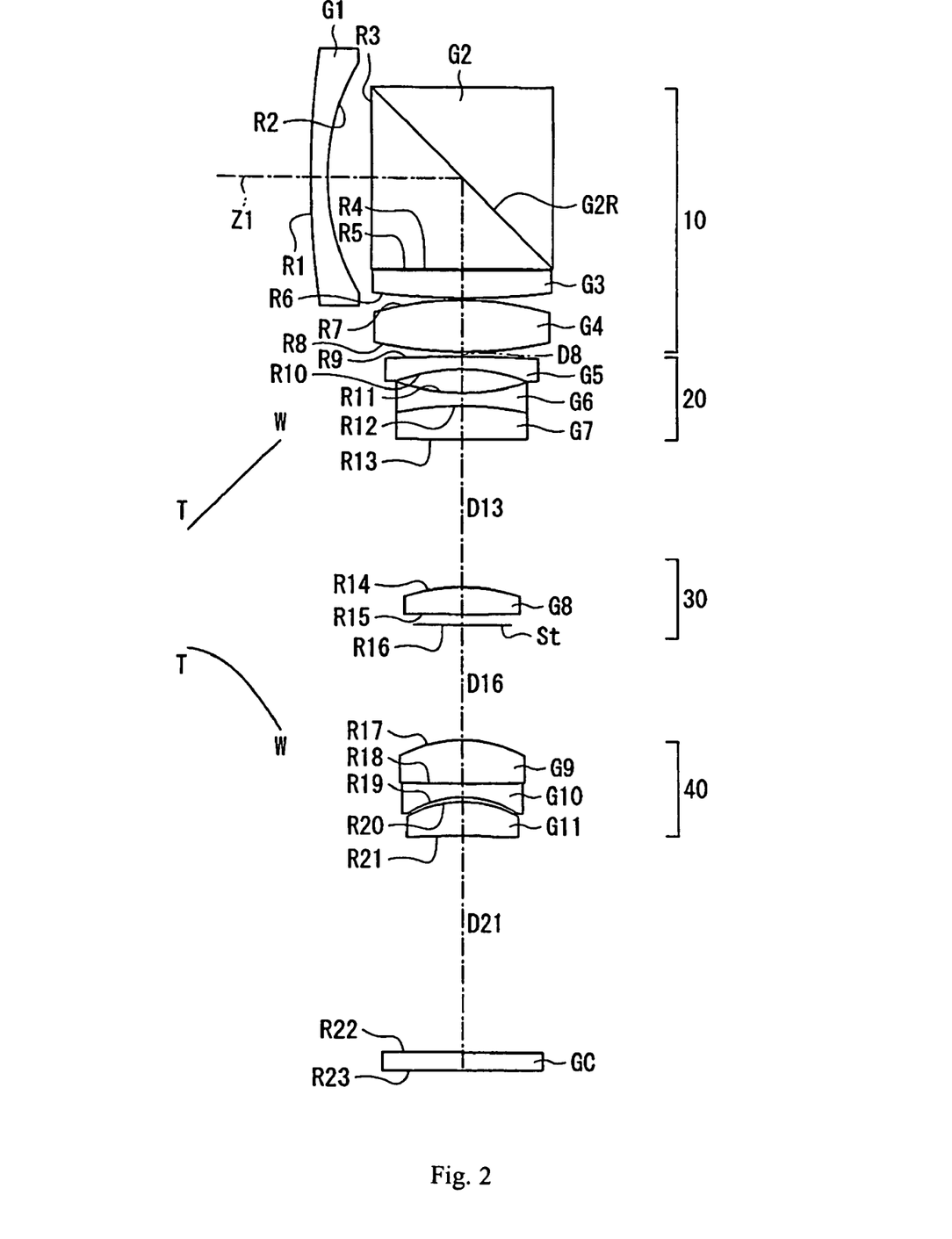
FIG. 2 shows a cross-sectional view of the zoom lens of Embodiment 2 at the wide-angle end.

FIG. 2 shows a cross-sectional view of the zoom lens of Embodiment 2 at the wide-angle end. Embodiment 2 is similar to Embodiment 1 and therefore only the differences between Embodiment 2 and Embodiment 1 will be explained. Embodiment 2 differs from Embodiment 1 in its lens element configuration by having different radii of curvature of the lens surfaces, different aspheric coefficients of the aspheric lens surfaces, different optical element surface spacings, and some different refractive indexes and Abbe numbers.

Table 5 below lists the group number (or GC, as appropriate), the surface number # in order from the object side, the radius of curvature R (in mm) of each surface on the optical axis, the on-axis surface spacing D (in mm) except that the on-axis surface spacings that vary with zooming are listed in Table 7 below, as well as the refractive index $N_d$ and the Abbe number $v_d$ at the d-line (587.6 nm) of each optical element for Embodiment 2. Note that although R is the on-axis radius of curvature, for convenience of illustration, in FIG. 2 the lead lines from the R reference symbols extend to the surfaces being referenced but do not extend to the on-axis positions. Listed in the bottom portion of Table 5 are the focal length f (in mm) and the f-number $F_{NO}$ at the wide-angle and telephoto ends, and the maximum field angle 2ω at the wide-angle end and at the telephoto end for Embodiment 2.

TABLE 5

| | # | R | D | $N_d$ | $v_d$ |
|---|---|---|---|---|---|
| 10 | 1 | 39.4181 | 0.76 | 1.92286 | 20.9 |
| 10 | 2 | 10.3791 | 2.00 | | |
| 10 | 3 | ∞ | 8.30 | 1.83481 | 42.7 |
| 10 | 4 | ∞ | 0.05 | | |
| 10 | 5 | −241.2155 | 1.25 | 1.76182 | 26.6 |
| 10 | 6 | −35.3822 | 0.10 | | |
| 10 | 7* | 13.8964 | 2.35 | 1.58809 | 60.4 |
| 10 | 8* | −18.6457 | D8 (variable) | | |
| 20 | 9 | 58.3809 | 0.58 | 1.72916 | 54.7 |
| 20 | 10 | 8.3596 | 1.09 | | |
| 20 | 11 | −9.2871 | 0.60 | 1.80400 | 46.6 |
| 20 | 12 | 12.9680 | 1.55 | 1.92286 | 18.9 |
| 20 | 13 | −168.8569 | D13 (variable) | | |
| 30 | 14* | 8.5418 | 1.25 | 1.51007 | 56.2 |
| 30 | 15* | −89.7208 | 0.50 | | |
| 30 | 16 | ∞ (stop) | D16 (variable) | | |
| 40 | 17 | 5.8907 | 2.00 | 1.83481 | 42.7 |
| 40 | 18 | −84.1818 | 0.59 | 1.84666 | 23.8 |
| 40 | 19 | 4.5889 | 0.24 | | |
| 40 | 20* | 5.7017 | 1.55 | 1.51680 | 64.2 |
| 40 | 21* | 25.0855 | D21 (variable) | | |

TABLE 5-continued

| GC | 22 | ∞ | 0.83 | 1.51680 | 64.2 |
|---|---|---|---|---|---|
| GC | 23 | ∞ | | | |

| f = 6.49-18.36 | $F_{NO}$ = 3.64-4.25 | 2ω = 61.4°-21.7° |
|---|---|---|

The lens surfaces with a * to the right of the surface number in Table 5 are aspheric lens surfaces, and the aspheric surface shapes of these lens surfaces are expressed by Equation (B) below. More specifically, in the zoom lens of Embodiment 2 as shown in FIG. 2: both surfaces of lens element G4, which has positive refractive power and is in the first lens group 10, are aspheric; both surfaces of lens element G8, which has positive refractive power and is in the third lens group 30, are aspheric; and both surfaces of lens element G11, which has positive refractive power and is in the fourth lens group 40, are aspheric.

$$Z = [(C \cdot Y^2)/\{1 + (1 - K \cdot C^2 \cdot Y^2)^{\frac{1}{2}}\}] + \\ A_3 \cdot Y^3 + A_4 \cdot Y^4 + A_5 \cdot Y^5 + A_6 \cdot Y^6 + A_7 \cdot Y^7 + \\ A_8 \cdot Y^8 + A_9 \cdot Y^9 + A_{10} \cdot Y^{10} + A_{11} \cdot Y^{11} + A_{12} \cdot Y^{12}$$

Equation (B)

where

Z is the length (in mm) of a line drawn from a point on the aspheric lens surface at a distance Y from the optical axis to the tangential plane of the aspheric surface vertex, C is the curvature (=1/the radius of curvature, R in mm) of the aspheric lens surface on the optical axis, Y is the distance (in mm) from the optical axis, K is the eccentricity, and $A_i$ is the ith aspheric coefficient, and the summation extends over i.

In Embodiment 2 of the present invention, only aspheric coefficients $A_3$-$A_{12}$ may be non-zero and some of these aspheric coefficients are zero for some of the aspheric surfaces.

Table 6 below lists the values of the constant K and the aspheric coefficients $A_3$-$A_{12}$ used in Equation (B) above to define each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0 \times 10^{-2}$.

In the zoom lens of Embodiment 2, lens groups 20 and 40 move along the optical axis during zooming to vary the separations of the four lens groups in order to provide a zoom ratio of about three. Therefore, the values of the on-axis spacings D8, D13, D16, and D21 vary. Table 7 below lists the values of these variables (i.e., the group spacings) at the wide-angle end (focal length f equals 6.49 mm) and at the telephoto end (focal length f equals 18.36 mm) with the zoom lens focused at infinity.

TABLE 7

| Focal Length f (mm) | D8 | D13 | D16 | D21 |
|---|---|---|---|---|
| 6.49 | 0.23 | 6.80 | 5.79 | 9.97 |
| 18.36 | 6.86 | 0.15 | 2.70 | 13.06 |

As set forth in Table 8 below, the zoom lens of Embodiment 2 of the present invention satisfies all of Conditions (1) through (3) above.

TABLE 8

| Condition No. | Condition | Value |
|---|---|---|
| (1) | −0.45 < f2/Tf < −0.3 | −0.35 |
| (2) | 0.8 < f4/Tf < 1.3 | 1.03 |
| (3) | 25 > νP | 18.90 |

Figure 5A:
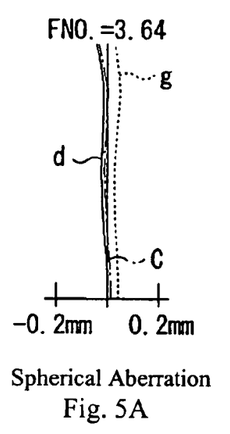
FIGS. 5A-5D show the spherical aberration, astigmatism, distortion, and lateral color, respectively, of the zoom lens of Embodiment 2 at the wide-angle end.
Figure 5B:
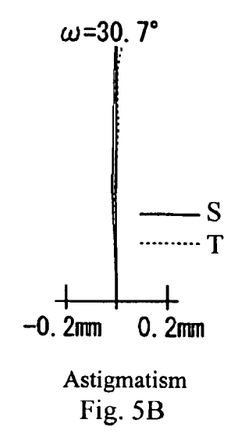
Figure 5C:
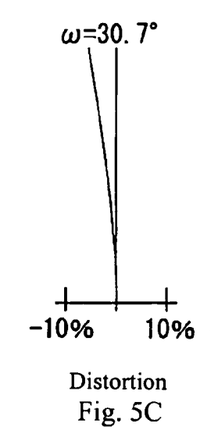
Figure 5D:
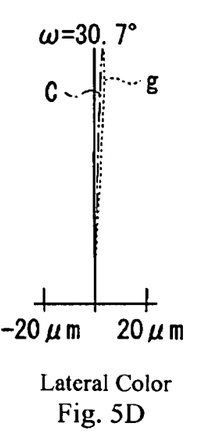
Figure 6A:
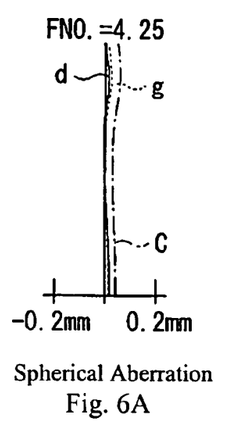
FIGS. 6A-6D show the spherical aberration, astigmatism, distortion, and lateral color, respectively, of the zoom lens of Embodiments 2 at the telephoto end.
Figure 6B:
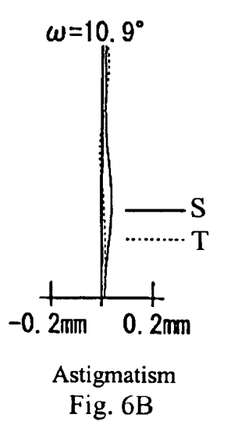
Figure 6C:
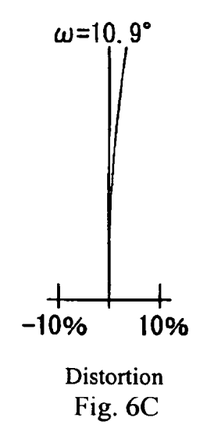
Figure 6D:
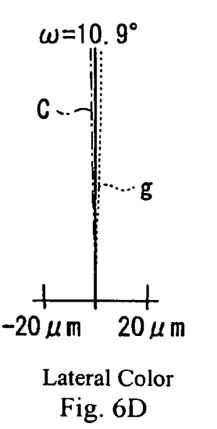

FIGS. 5A-5D show the spherical aberration, astigmatism, distortion, and lateral color, respectively, of the zoom lens of Embodiment 2 at the wide-angle end. FIGS. 6A-6D show the spherical aberration, astigmatism, distortion, and lateral color, respectively, of the zoom lens of Embodiment 2 at the telephoto end. In FIGS. 5A and 6A, the spherical aberration (in mm) is shown for the wavelengths 587.6 nm (the d-line), 435.8 nm (the g-line), and 656.3 nm (the C-line), and the f-number (FNO.) is shown. In the remaining figures, c is the half-field angle. In FIGS. 5B and 6B, the astigmatism (in mm) is shown for both the sagittal image surface S (solid line) and the tangential image surface T (broken line) and is measured at 587.6 nm (the d-line). In FIGS. 5C and 6C, distortion (in percent) is measured at 587.6 nm (the d-line). In FIGS. 5D and 6D, the lateral color (in μm) is shown for the wavelengths 435.8 nm (the g-line) and 656.3 nm (the C-line) relative to 587.6 nm (the d-line).

As is evident from FIGS. 5A-5D and 6A-6D and from the numerical data in the tables above, aberrations are well

TABLE 6

| # | K | $A_3$ | $A_4$ | $A_5$ | $A_6$ | $A_7$ |
|---|---|---|---|---|---|---|
| 7 | 0.9042386 | 2.4520549E-4 | −7.9692904E-5 | −2.8018362E-5 | 5.0025113E-6 | 9.0331766E-8 |
| 8 | 0.9770572 | 4.4513974E-4 | −1.8004757E-4 | 6.2236853E-6 | 4.8378460E-6 | −6.4157530E-8 |
| 14 | 1.1329410 | 0 | 6.8550321E-5 | 0 | 3.8417326E-6 | 0 |
| 15 | 0.9987394 | 0 | 3.6694963E-4 | 0 | 2.7410339E-5 | 0 |
| 20 | 1.7000254 | 2.4261209E-4 | 5.3720100E-4 | 8.8773062E-6 | 3.0577261E-5 | 2.3271041E-7 |
| 21 | 1.0333767 | −1.0035360E-4 | 2.7951369E-3 | −7.2485598E-5 | 7.3517201E-5 | −4.8998957E-7 |

| # | $A_8$ | $A_9$ | $A_{10}$ | $A_{11}$ | $A_{12}$ |
|---|---|---|---|---|---|
| 7 | 6.6795346E-8 | −6.6889889E-9 | −1.4118112E-9 | −3.7172727E-10 | −2.5741176E-11 |
| 8 | 3.0444581E-8 | −1.3776770E-8 | −2.5760713E-9 | −1.0405539E-10 | 7.5729919E-12 |
| 14 | 2.0596064E-6 | 0 | −1.0909457E-7 | 0 | 0 |
| 15 | −1.8018674E-6 | 0 | 9.3620748E-8 | 0 | 0 |
| 20 | 2.6163662E-6 | 3.5827687E-11 | 7.2786675E-8 | −5.1735533E-11 | 1.6894719E-13 |
| 21 | 1.0875630E-5 | −1.0550646E-9 | 1.8032897E-7 | −1.7358934E-10 | −2.5370451E-11 | corrected in Embodiment 2 of the present invention, and a zoom lens suitable for mounting in a thin image pickup device can be realized.

The zoom lens of the present invention enables realizing a zoom lens suitable for mounting on an image pickup device in order to make the device thin because the first lens group includes a reflecting member having a reflecting surface for folding the optical axis at least approximately ninety degrees so as to achieve thinness and Conditions (1) and (2) above are satisfied by the zoom lens in order to provide for each lens group having the proper construction and refractive power.

The present invention is not limited to the aforementioned embodiments, as it will be obvious that various alternative implementations are possible. For instance, values such as the radius of curvature R of each of the lens elements and components, the surface spacings D, the refractive index $N_d$, as well as the Abbe number $v_d$, are not limited to the values of the embodiments described above, as other values can be adopted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens having an object side and an image side and comprising, arranged along an optical axis in order from the object side as follows:
    a first lens group having positive refractive power and including a reflecting member having a reflecting surface for folding the optical axis at least approximately ninety degrees;
    a second lens group having negative refractive power;
    a third lens group having positive refractive power and having a stop on its image side; and
    a fourth lens group having positive refractive power; wherein
    said second lens group and said fourth lens group move along the optical axis during zooming, and said fourth lens group moves along the optical axis during focusing of the zoom lens;
    said fourth lens group includes a lens component having negative refractive power that is formed by cementing together at least two lens elements, and a lens component having positive refractive power and a meniscus shape with at least one aspheric surface and with its convex surface on the object side; and
    the following conditions are satisfied:

$-0.45 < f2/Tf < -0.3$ $0.8 < f4/Tf < 1.3$ where
    f2 is the focal length of said second lens group,
    f4 is the focal length of said fourth lens group, and
    Tf is the focal length of the zoom lens at the telephoto end;
    wherein said first lens group comprises, in order from the object side:
    a lens element having negative refractive power and a meniscus shape with its convex surface on the object side;
    a right-angle prism that provides said reflecting surface;
    a lens element having positive refractive power and having a convex surface on the image side; and
    a biconvex lens element.

2. The zoom lens of claim 1, wherein said third lens group includes only a single lens element and said single lens element is made of plastic and includes at least one aspheric surface.

3. The zoom lens of claim 1, wherein:
    said second lens group includes, in order from the object side, a lens component of negative refractive power and a meniscus shape with its convex surface on the object side, and a lens component of negative refractive power that is formed by cementing together at least two lens elements; and
    said at least two lens elements of said second lens group include a lens element of positive refractive power that satisfies the following condition:

$25 > vP$ where
    vP is the Abbe number of said lens element of positive refractive power in said second lens group.

4. The zoom lens of claim 2, wherein:
    said second lens group includes, in order from the object side, a lens component of negative refractive power and a meniscus shape with its convex surface on the object side, and a lens component of negative refractive power that is formed by cementing together at least two lens elements; and
    said at least two lens elements of said second lens group include a lens element of positive refractive power that satisfies the following condition:

$25 > vP$ where
    vP is the Abbe number of said lens element of positive refractive power in said second lens group.

* * * * *

UNITED STATES PATENT AND TRADEMARK OFFICE
CERTIFICATE OF CORRECTION

PATENT NO. : 7,315,423 B2 Page 1 of 1
APPLICATION NO. : 11/345318
DATED : January 1, 2008
INVENTOR(S) : Sato It is certified that error appears in the above-identified patent and that said Letters Patent is hereby corrected as shown below:

Column 2
Line 39, change "Embodiments" to -- Embodiment --;

Column 6
Lines 66 - 67, change the equation to
-- $$Z = [(C \cdot Y^2) / \{1 + (1 - K \cdot C^2 \cdot Y^2)^{\frac{1}{2}}\}] + A_4 \cdot Y^4 + A_6 \cdot Y^6 + A_8 \cdot Y^8 + A_{10} \cdot Y^{10}$$ ... Equation (A) --; and Column 10
Line 38, change "figures, c" to -- figures, ω --.

Signed and Sealed this

Sixth Day of May, 2008

JON W. DUDAS
*Director of the United States Patent and Trademark Office*